Aug. 23, 1955 R. L. DOERRFELD 2,716,157
FEED OUT MECHANISM FOR TELEGRAPH PRINTERS
Filed March 6, 1953
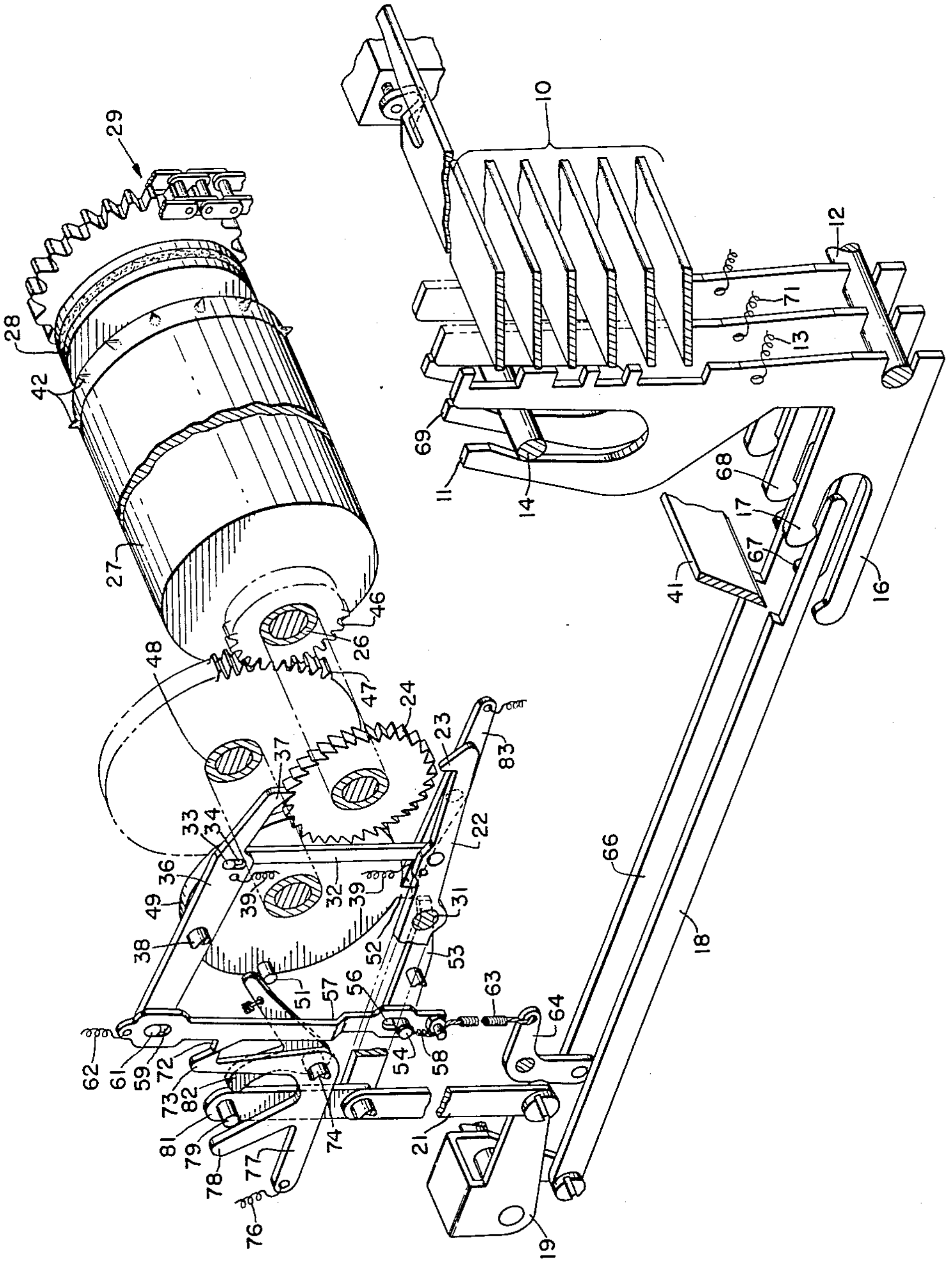
INVENTOR
ROBERT L. DOERRFELD
BY Emery Robinson
ATTORNEY

United States Patent Office 2,716,157

Patented Aug. 23, 1955

2,716,157

FEED OUT MECHANISM FOR TELEGRAPH PRINTERS

Robert L. Doerrfeld, Chicago, Ill., assignor to Teletype Corporation, Chicago, Ill., a corporation of Delaware Application March 6, 1953, Serial No. 340,865

5 Claims. (Cl. 178—42)

This invention relates to a feed out mechanism for telegraph printers and more particularly to a telegraph printer having a platen adapted to be normally advanced in one line increments in response to a first predetermined signal, but which is capable of being automatically advanced a variable number of line increments upon reception of a second predetermined signal.

In operation of many telegraph systems, it often becomes desirable or necessary to print messages on a record medium comprising a plurality of previously prepared forms, bills, tickets, coupons, etc., having areas thereon which may or may not contain preprinted matter but also having preselected areas thereon for the insertion of printed matter in accordance with incoming telegraph signals. Upon completion of the insertion of the printed matter in accordance with the incoming signals, it is then necessary to advance the record medium to advance a new form into the printing position. In use of the telegraph printers for such insertion purposes it frequently occurs that the number of lines to be inserted vary with each form, but the size of the form is usually uniform. Prior systems in many instances relied upon the transmission of a sufficient number of line feed signals to effectuate an advance of the record medium to present a new form to the printing position. This procedure is obviously an expensive and wasteful consumption of transmission line time which could well be utilized for the subsequent transmission of intelligence to fill out the next succeeding form. Several devices have previously been developed to solve this problem, however, these devices have generally taken the form of auxiliary mechanisms for ascertaining predetermined indicia contained in the record medium or have taken the form of timing devices employing rather complex mechanisms.

A primary object of the invention resides in a provision of a dependable mechanical device for attachment to printing telegraph apparatus to effectuate either rapid single or varying multiple line feeding operations of a record medium.

It is a further object of this invention to provide a multiple line feeding device for printing telegraph apparatus which once initiated into operation will continue to function regardless of the signals impressed on the incoming transmission line.

More specifically, a feature of the invention provides a latching device for retaining a record medium feeding device in an operative condition until a predetermined number of line feeding operations are completed.

The present invention is described in relation to a printing telegraph apparatus such as disclosed in the patent to S. Morton et al. No. 1,904,164, dated April 18, 1933, therefore, a complete description of the elemental parts and subassemblies of the printer which are not necessary for a complete understanding of the present invention are omitted for the purpose of simplifying the disclosure and hence making the present invention more understandable. It is to be understood, however, that the principles of the present invention are not to be restricted to an incorporation in an identical printer, but are advantageously adapted to incorporation in other types of printing telegraph apparatus.

With these and other objects in view the present invention contemplates a printing telegraph apparatus of the type shown in the afore-identified Morton et al. patent, but modified to provide a continuous frictional drive for the platen. Control of the advance of the platen is obtained through the instrumentality of an escapement mechanism which is adapted to be actuated in accordance with line feed signals to permit the frictional drive to advance the platen in one line increments upon each reception of a line feed signal. Whenever it is desired to advance the platen to present a new form to printing position, a special signal is received by the apparatus to initiate into operation a mechanism which disconnects the escapement mechanism to permit the continuous advance to the platen by the frictional drive device. Associated with the rotating platen is a control mechanism which enables the platen to advance only a sufficient amount to present a new form to the printing position whereupon the platen is prevented from further advance by the frictional drive device. A latching device is also provided to insure that the escapement mechanism does not interrupt the advancement of the platen while the platen is advancing to present a new form to the printing position.

Other objects and advantages of the invention will be apparent from the following detailed description when considered in conjunction with the accompanying drawing wherein there is disclosed a perspective view of a portion of printing telegraph apparatus having attached thereto a feed out mechanism embodying the features of the invention.

With reference to the drawing there is disclosed a plurality of selector vanes 10 identical to selector vanes 36 to 40 and 50 shown in the above-mentioned patent to S. Morton et al. As described in the Morton et al. patent these selector vanes are permutatively positioned in accordance with the reception of a series of telegraph signal impulses by the receiving telegraph apparatus. Associated with the selector vanes 10 is a line feed function lever 11 pivotally mounted about a shaft 12. Urging the function lever 11 into engagement with the vanes 10 is a spring 13, but the function lever is restrained from such positionment by a function lever bail 14. The function lever 11 is provided with a pair of lobed tines 16 and 17 spaced apart to subtend one end of an operating arm 18. The operating arm 18 is pivotally connected to a depending arm of a pivotally mounted L-shaped member 19. A horizontal arm of the member 19 is pivotally connected to one end of a link 21 which is pivotally connected at its other end to a pawl 22. A tooth 23 is formed on the pawl 22 and is adapted to cooperate with the teeth of a ratchet 24 secured to a shaft 26. Mounted on the shaft 26 is a platen 27 adapted to be driven through a friction clutch 28 driven by a constantly rotating sprocket and chain device 29. The motor (not shown) of the printing telegraph apparatus is utilized to supply a constant source of driving power for the sprocket and chain device 29.

Returning now to a consideration of the pawl 22 which is pivotally mounted about a stud shaft 31, there is also pivotally connected to the pawl 22 a strut member 32 having formed on its upper extremity a pin 33. This pin extends within a slot 34 formed in a second pawl 36 also having a tooth 37 formed thereon to cooperate with the teeth of the ratchet 24. Pawl 36 is pivotally mounted about a stud shaft 38 and is urged toward pawl 22 through the agency of an extended tension spring 39.

Briefly, the operation of the line feed mechanism heretofore set forth is as follows: the reception of a line feed signal positions the selector vanes 10 whereupon the release of the bail 14, as described in the afore-identified Morton et al. patent, allows the notched function lever 11 to pivot. Pivotal movement of the function lever 11 moves the lobed portion of the tine 16 into engagement with the underside of the operating lever 18 to move said operating lever upwardly to position an abutment formed thereon in the path of a cyclically movable bail blade 41. This bail blade 41 is identical to the bail blade 188 shown in the above-identified Morton et al. patent and as described therein this bail cyclically operates in timed relation subsequent to the positionment of the selector vanes in accordance with each incoming signal. Movement of the blade 41 is imparted to the operating arm 18 to pivot the L-shaped member 19 in a clockwise direction, hence the link 21 is moved downwardly to pivot the pawl 22 about the stud shaft 31. Movement of the pawl 22 positions the tooth 23 within the space formed by two adjacent teeth on the ratchet 24. Movement of the pawl 22 is also imparted through the strut 32, through the second pawl 36, to withdraw the tooth 37 from engagement with the teeth of the ratchet 24. This operation permits driving power to be transmitted from the constantly rotating sprocket and chain device 29, through the frictional clutch 28, through the shaft 26, to advance the ratchet 24 until the ratchet advances a half a tooth length to engage another tooth thereon with the tooth 23 which causes the frictional clutch to again disrupt the transmission of power.

Subsequent to the reception of the line feed signal, the operating arm 18, the L-shaped member 19, the link 21, and the pawl 22 are restored to the initial position shown in the drawing. As the tooth 23 is withdrawn from the ratchet 24 by the pawl 22, the pawl 22 also moves the strut 32 downwardly to move the pawl 36 and consequently the tooth 37 moves into a space between two adjacent teeth formed on the ratchet 24. When this occurs, rotative power is again transmitted through the clutch 28 to permit the ratchet 24 to again advance another half a tooth length to bring another tooth thereon into engagement with the tooth 37 to again prevent the transmission of power through the clutch 28.

Formed on the platen 27 is a plurality of sprocket feed pins 42 adapted to engage feed holes formed in a recording medium (not shown). The diameter of the platen 27 and the dimensions selected for the escapement mechanisms are such that upon actuation of the escapement mechanism in response to each line feed signal the platen 27 is advanced to present a new line of the recording medium to a printing position.

Turning now to a consideration of the specific improvement which permits the platen to advance a multiple number of line increments, there is secured to the shaft 26 a pinion 46 adapted to drive a gear 47 secured to a rotatively mounted sleeve 48. Attached to the sleeve 48 is a cam 49 having a pin 51 extending from the lateral face thereof in the vicinity of its outer periphery. There is also formed on cam 49 a stop lug 52. Associated with and adapted to cooperate with the stop lug 52 is a pivotally mounted stop arm 53 which has formed thereon a pin 54 adapted to be positioned within a slot 56 formed in a slide member 57. Pin 54 is urged to rest against the lower wall of the slot 56 by an extended tension spring 58 interconnecting the pin 54 with the slide member 57. The upper extremity of the slide member 57 is enlarged and has formed therein a slot 59 into which is positioned a stud 61 formed on the second pawl 36. There is provided an extended tension spring 62 attached to the slide member 57 to urge said member in an upwardly direction. Attached to the lower portion of the slide member 57 is a bowden wire or link 63 connected at its other end to a horizontal arm of a bell crank 64. The bell crank 64 is provided with a vertical arm having connected at its extremity an operating arm 66. The operating arm 66 is positioned at one end between a pair of lobed tines 67 and 68 which form a part of a function lever 69. The function lever 69 is similar to the function lever 11 but is notched in such a manner as to be only pivoted by an extended tension spring 71 upon the selector vanes 10 assuming a predetermined permutative positionment indicative of a tabulator or form feed out signal.

Returning now to a consideration of the slide member 57 there is formed thereon a latching abutment 72 adapted to be engaged by a latch 73. This latch 73 is pivotally mounted about a shaft 74 and is urged in a clockwise direction by a spring 76 which is attached to a laterally extending arm 77. Latch 73 is also provided with an arm 78 which is adapted to cooperate with a pin 79 formed on a lever 81. Lever 81 is pivotally attached to link 21 and is positioned to be engaged by one arm of a V-shaped holding member 82. The other arm of the V-shaped member 82 is adapted to be positioned by the pin 51 formed on the cam 49.

It is to be noted that each time the platen is advanced one increment in response to a line feed signal the pinion 46 is advanced and rotates the gear 47 one increment. Rotation of the gear 47 is imparted through the sleeve 48 to the cam 49. Advancement of the cam 49 withdraws the pin 51 from engagement with the V-shaped holding member 82 and also moves the stop lug 52 from a position spaced from, but in register with, the stop arm 53.

In operation of the mechanism comprising the invention, assume that the elements are in the position shown in the drawing and that the first of a series of equal sized forms is positioned on the platen in the first printing position. Upon each printing of a line, the platen 27 is advanced one increment to successively advance the cam 49. When all the information to be placed on the form has been printed thereon a tabulator or multiple line feed out signal is received by the printing telegraph apparatus to set the vanes in a manner determined by the incoming permutative signal impulses. With the vanes positioned by the tabulator signal the function lever 69 is pivoted when the function lever bail 14 is released. Movement of the function lever 69 moves the tine 67 upwardly to engage and move a notched abutment formed in or on the operating arm 66 into register with the bail blade 41. Movement of the bail blade 41 is thereupon imparted through the operating arm 66 to the bell crank 64 to cause the Bowden wire or link 63 to move in a downwardly direction and hence the slide member 57 is also moved downward. When the slide member 57 moves, the pin 61 being in engagement with the upper surface of the slot 59 also moves to cause the second pawl 36 to pivot about the shaft 38 and manifestly move the tooth 37 from engagement with the ratchet 24. This movement is possible because the pin 33 is permitted to ride in slot 34 without imparting movement to the strut 32. Inasmuch as the tooth 23 is normally held disengaged from the ratchet 24, continual rotative movement is imparted through the clutch 28 to advance the platen 27, hence rotating the pinion 46, the gear 47 and the cam 49.

The movement of the slide member 57 is also imparted through the spring 58 to the pin 54 and thus the stop arm 53 is pivoted into the path of the moving stop lug 52. The cam 49 continues to advance until the stop lug 52 engages stop arm 53 whereupon rotative movement can no longer be transmitted through the frictional clutch 28 to the platen 27. There is also associated with the stop lug 52 a spring biased anti-back-lash arm 83 which overrides the stop lug 52 and falls behind the stop lug when the stop lug is engaged by the stop arm 53. Obviously with the arm 83 positioned behind the stop lug 52 any possibility of the cam 49 rebounding is obviated.

When the slide 57 moves downwardly, the latching abutment 72 is brought beneath the spring biased latch 73 to permit the latch to engage and hold the slide in the downward position, therefore, the free rotation of the platen 27 continues unabated, regardless of the fact that the operating arm 66 is restored to the unoperated position. When the cam 49 is precluded from further rotation, then the pin 51 is positioned in engagement with the V-shaped holding member 82 to hold said member in engagement with the lever 81.

The advance of the platen is such that when a new form is presented to the printing portion and upon printing of the first line of information, a line feed signal is again received to position the selector vanes 10. As previously described the positionment of the selector vanes 10 in accordance with a line feed signal causes the function lever 11 to pivot to control the movement of the operating arm 18 by the bail 41. Movement of the operating arm 18 is again imparted through member 19 to cause the link 21 to move downwardly and hence move the lever 81 in a downward direction. As the lever 81 moves down the pin 79 engages the arm 78 to pivot the latch member 73 out of engagement with the abutment 72 to condition the pawl 36 to subsequently position the tooth 37 between a pair of teeth on the ratchet 24. Release of the latch 73 and the upward movement of the slide member 57 due to the extended tension spring 62 also causes the slide 57 to engage and move the pin 54. The pin 54 being connected to the stop arm 53 causes the stop arm 53 to pivot out of engagement with the stop lug 52 to permit the clutch 28 to again drive the platen 27 and the ratchet 24.

Recalling that upon actuation of the link 21 in response to a line feed siegnal, the pawl 22 is caused to pivot, then it may be appreciated that the tooth 23 is positioned within the space between two teeth on the ratchet 24 and hence the advance of the ratchet 24 is limited to the distance of one half a tooth length. Upon restoration of the operating arm 18 to the initial position the tooth 23 is withdrawn from the teeth of the ratchet 24, however, when the pawl 22 returns to the initial position the link 32 moves downwardly to draw the pawl 36 with it and consequently the tooth 37 is positioned within a pair of teeth on the ratchet 22 to limit the movement of the ratchet to the distance of one half a tooth length. The apparatus is now restored to the initial rest position as shown in the drawing and is in condition to receive subsequent line feed or tabulator signals.

If the apparatus is performing a tabulator function and during feed of the form, a line feed signal is received by the apparatus the selector vanes 10 will again be permutatively positioned to allow the function lever 11 to operate. Operation of the function lever 11 positions the tine 16 to permit the bail blade 41 to impart movement to the operating arm 18 to again pivot the member 19. Link 21 thereupon moves downwardly to pivot the pawl 22 and consequently position the tooth 23 within the teeth of the ratchet 24 to arrest the movement of the ratchet. Upon downward movement of the link 21, the lever 81 will pivot because the V-shaped member 82 is not in register with the pin 51 and hence the lever 81 is free to pivot and the pin 79 thereon does not disengage the latch 73. Upon completion of this operation and the restoration of the operating arm 18 to the unoperated position, the tooth 23 is withdrawn from the teeth of the ratchet to permit the continuation of the tabulator operation. Tooth 37 is not moved back into engagement with the ratchet 24 because the pawl 36 operatively connected with the slide 57 is latched in an elevated position. The slot 34 formed in the pawl 36 permits the movement of the pin therein without effecting a positionment of the tooth 37 within the ratchet 24. It may be thus appreciated that once a tabulator cycle of operation is initiated, said operation continues until stopped by the arm 53 engaging the lug 52.

It is to be understood that the above described arrangements of apparatus and construction of elemental parts are simply illustrative of the principles of the invention and many other modifications may be made without departing from the invention.

What is claimed is:

1. In a telegraph printer, a rotatable platen, means continuously tending to advance said platen, a ratchet associated with said platen and rotatable therewith, an escapement mechanism cooperating with said ratchet to control the advancement of said platen by said advancing means, means operable in response to a first predetermined signal for causing said escapement mechanism to release the ratchet to permit the advancing means to advance the platen a step, a latch for engaging and holding said escapement mechanism from engagement with said ratchet, means for actuating said latch in response to a second special signal, and means responsive to said first predetermined signal for releasing said latch.

2. In a device for feeding forms out of a printing telegraph apparatus, a platen, a friction driving means for advancing the platen, a mechanism for holding the platen against advancement, a first means adapted to be actuated by a first preconcerted signal for releasing the holding mechanism to permit the driving means to advance the platen one increment, a second means adapted to be actuated by a second preconcerted signal for releasing the holding mechanism to permit the drive means to advance the platen, means for stopping the platen in a predetermined position, and means actuated by the operation of the first releasing means when the platen is positioned in said predetermined stop position for releasing the stop means and repositioning the holding mechanism.

3. In a printing telegraph apparatus, a platen, drive means for normally urging said platen to advance, an escapement mechanism associated with said platen to normally hold said platen from advancement, a first mechanism actuated by the reception of a line feed signal in the telegraph apparatus for releasing the escapement mechanism to permit the drive means to advance the platen a single increment, a second mechanism actuated by the reception of a special signal in the telegraph apparatus for releasing the escapement mechanism to permit the advance of the platen by the drive means, a latch operated by the second mechanism for holding the escapement mechanism disengaged from the ratchet, means for limiting the extent of advance of the ratchet and platen to a predetermined position, and means responsive to a line feed signal for releasing the latch and re-engaging the escapement mechanism when the platen is in the predetermined position.

4. In a printing telegraph apparatus, a platen, means normally tending to advance the platen, a ratchet connected to said platen, an escapement mechanism for engaging the ratchet to prevent the advance of the platen, a first means responsive to a line feed signal for releasing the escapement mechanism to permit the platen to advance one increment, a cam adapted to be advanced by the platen, a second means responsive to a special signal for releasing the escapement mechanism, a latch for holding the second escapement releasing means to permit the platen to advance, means associated with the cam for stopping the cam and platen in a predetermined stop position, a member connected to the first escapement releasing means for releasing said latch, and means attached to the cam and positioned by the cam in the stop position for engaging the member whereby actuation of the first releasing means causes the member to release the latch.

5. In a device for feeding forms out of a printing telegraph apparatus, a platen, means on the platen for engaging the forms, a clutch adapted to drive the platen, an escapement mechanism for preventing the advance of the platen, a first linkage device adapted to release the escapement mechanism to permit the platen to advance one increment, a second linkage device for releasing the escapement mechanism, means for actuating said second linkage in response to the receipt of a preconcerted signal in the telegraph apparatus, a latch for holding the second linkage in the actuated position, a controller member advanced by the platen, a stop member positioned by the second linkage to engage and hold the controller member after a predetermined advance of the platen, a link freely mounted for pivotal movement on said first linkage, an element moved by said controller into position to engage and hold said link from pivotal movement when said controller is positioned by the stop member, and means on said pivotally mounted link for disengaging said latch when said first linkage is actuated and said controller is positioned by the stop member.

References Cited in the file of this patent

UNITED STATES PATENTS

| | | |
|---|---|---|
| 2,285,790 | Allen | June 9, 1942 |
| 2,536,528 | Baldwin | Jan. 2, 1951 |
| 2,554,903 | Goetz | May 29, 1951 |
| 2,571,182 | Baldwin | Oct. 16, 1951 |